US005552807A

United States Patent [19]
Hayes et al.

[11] Patent Number: 5,552,807
[45] Date of Patent: Sep. 3, 1996

[54] FOOT PEDAL ASSEMBLY FOR USE WITH PERSONAL COMPUTER

[76] Inventors: Charles L. Hayes, 4421 Highland Ave., Carlsbad, Calif. 92008; Thomas E. Veloskey, 6557 Corte Cisco, Carlsbad, Calif. 92009

[21] Appl. No.: 350,646

[22] Filed: Dec. 7, 1994

[51] Int. Cl.⁶ .................................................. G09G 5/00
[52] U.S. Cl. ............................ 345/156; 345/184; 434/45
[58] Field of Search .......................... D21/13; 345/156, 345/157, 167, 184; 74/481, 512, 513, 514, 560; 273/148 B, 434, 438, 85 G; 434/43, 45

[56] References Cited

U.S. PATENT DOCUMENTS

| | | | |
|---|---|---|---|
| D. 339,612 | 9/1993 | Carter et al. | D21/13 |
| 4,713,007 | 12/1987 | Alban | 434/45 |
| 5,148,152 | 9/1992 | Stueckle et al. | 345/156 |
| 5,177,473 | 1/1993 | Drysdale | 434/45 |
| 5,245,320 | 9/1993 | Bouton | 345/167 |
| 5,334,997 | 8/1994 | Scallon | 345/167 |

OTHER PUBLICATIONS

Advertisement from *Computer Entertainment News*, vol. 3, Issue 4 entitled, "Thrustmaster".

Primary Examiner—Richard Hjerpe
Assistant Examiner—Steve Saras
Attorney, Agent, or Firm—Thomas J. Tighe

[57] ABSTRACT

The foot pedal assembly of the present invention generates and provides three inputs to a personal computer. Each of the two foot pedals of the foot pedal assembly pivot and generate an input in the form of an electrical signal in proportion to the pivoted position of the foot pedal. Each foot pedal is connected to a slidable foot pedal support, which pivotally supports the foot pedal and which allows the foot pedal to slide in forward and reverse directions. A connecting member rotatably and slidably connects the two foot pedal supports, and rotates about an axis located between the two foot pedal supports. A signal generator is operably connected to the connecting member for generating a third axis of input in the form of an electrical signal in proportion to a rotated position of the connecting member.

33 Claims, 7 Drawing Sheets

FOOT PEDAL ASSEMBLY FOR USE WITH PERSONAL COMPUTER

BACKGROUND OF THE INVENTION

1. Field of the Invention

The present invention relates generally to improvements in user interface control devices for personal computers and, more particularly, pertains to a new and improved foot pedal assembly wherein a user can input data by activating foot pedals.

2. Description of Related Art

In the field of user interface devices for game applications, it has been a practice to employ joysticks and foot pedals for users to manipulate as input devices for flight control computer games or driving games. Such devices have fallen short in providing the user with adequate control at a reasonable cost.

Some prior art devices have configured foot pedal assemblies for use in flight simulators. These foot pedal assemblies are used in connection with commercial flight simulators and, accordingly, often involve complex and expensive components. Other toot pedal assemblies for use with driving games may be relatively inexpensive, but these assemblies cannot be used with flight control computer games. All such interface devices have been unsatisfactory in that they do not have a simple, inexpensive construction that can be used with personal computers for both flying and driving games.

SUMMARY OF THE INVENTION

The foot pedal assembly of the present invention generates three inputs to a personal computer. Each of the two foot pedals of the foot pedal assembly pivot and generate an input in the form of an electrical signal in proportion to the pivoted position of the foot pedal. Each foot pedal is connected to a slidable foot pedal support, which pivotally supports the foot pedal and which allows the foot pedal to slide in forward and reverse directions. A connecting member rotatably and slidably connects the two foot pedal supports. It rotates about an axis located between the two foot pedal supports. A signal generator operably connected to the rotatable connecting member generates a third input in the form of an electrical signal in proportion to a rotated position of the rotatable connecting member.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best mode contemplated by the inventors of carrying out their invention. Various modifications, however, will remain readily apparent to those skilled in the art, since the generic principles of the present invention have been defined herein specifically.

Figure 1:
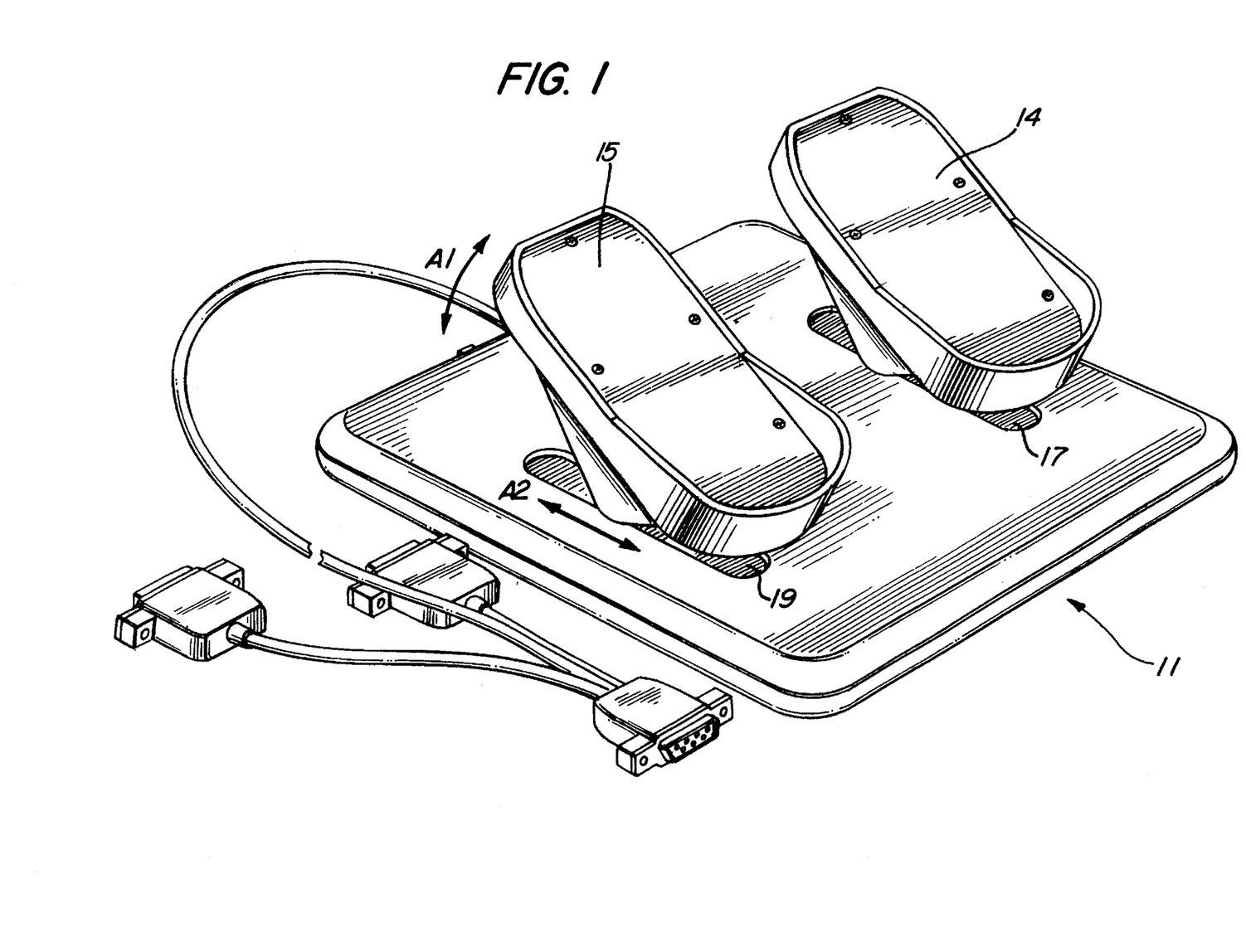
FIG. 1 is a perspective illustration of the foot pedal assembly according to the presently preferred embodiment.

Turning to FIG. 1, the foot pedal assembly 11 of the presently preferred embodiment is shown having a right foot pedal 14 and a left foot pedal 15. A right foot pedal support 17 pivotally supports the right foot pedal 14. Similarly, the left foot pedal 15 is pivotally supported by a left foot pedal support 19. Each of the two foot pedals 14, 15 can be pivoted as shown by the arrow A1, and can be slid forward and backward as shown by the arrow A2.

Figure 2:
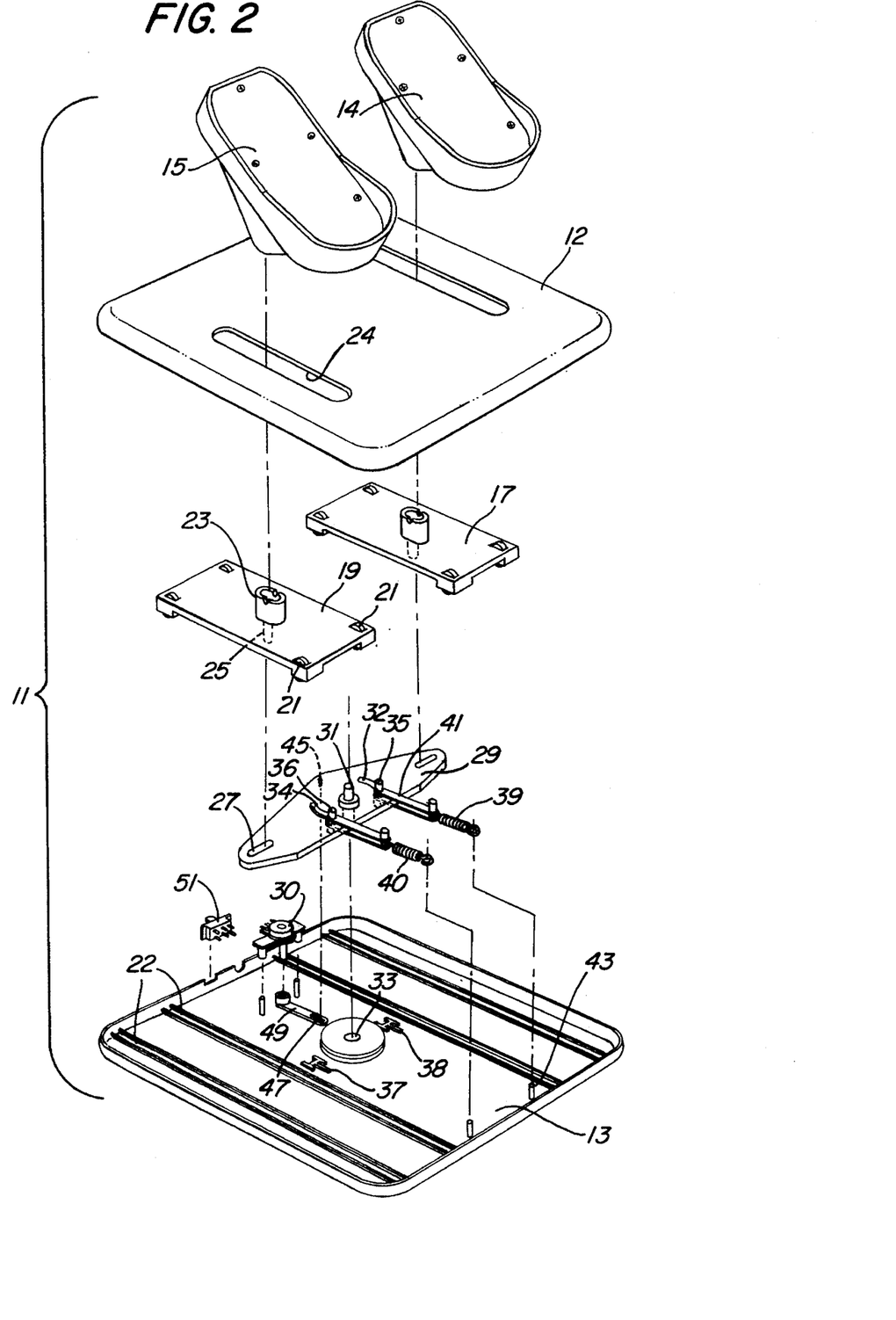
FIG. 2 is an exploded diagram of the foot pedal assembly according to the presently preferred embodiment.

An exploded view of the foot pedal assembly 11 is shown in FIG. 2. Most of the components are assembled between an upper housing shell 12 and a lower housing shell 13. The right foot pedal support 17 and the left foot pedal support 19 each have a protrusion 23 which extends through a slot 24 in the upper housing 12. In order to facilitate sliding of the right and left foot pedal supports 17, 19 and rollers 21 are provided, which roll within roller channels 22 on the lower housing shell 13 and on the inside surface of the upper housing shell 12. Thus, the left foot pedal 15, for example, can pivot about protrusion 23 and can be moved forward and backward within slot 24 on rollers 21.

In a driving mode, pivoting of the right foot pedal 14 generates an input which can be interpreted by the gaming device 91 (FIG. 7) as gas foot pedal motion, for example. Pivoting of the left foot pedal 15 generates a second input which can be interpreted in the driving mode as brake foot pedal action. The foot pedals 14, 15 are not slid during the driving mode. Signals that can be generated by sliding the two foot pedals 14, 15 within the slots 24 are not used in the driving mode.

In the flying mode, pivoting of the left foot pedal 15 and the right foot pedal 14 corresponds to toe brake action. That is, pivoting of the left and right foot pedals 14, 15 while the simulated aircraft is on the ground during play corresponds to applying brakes to left and right wheels, respectively. Sliding of the left and right foot pedals 14, 15 forward and backward while the simulated aircraft is on the ground moves a simulated front wheel left and right. In the air, sliding of the right and left foot pedals 14, 15 forward and backward corresponds to movement of a simulated rear rudder. For example, pushing the left foot pedal 15 forward moves the right foot pedal 14 backward, and the distal end of the rear rudder of a simulated aircraft pivots to the left.

The structure of the presently preferred embodiment used for generating the rear rudder electric signal in response to the relative forward and backward positions of the right and left foot pedals 14, 15 is generally located beneath the two foot pedal supports 17, 19.

Each of the two lower pins 25 extending below the foot pedal supports 17, 19 fits into a corresponding slot 27 of a rotatable connecting member 29. The rotatable connecting member 29 has an axle 31 which fits into an axle aperture 33 of lower housing shell 13. Looking just at the lower pins 25 of the foot pedal supports 17, 19, the slots 27, and the axle 31 fitting into the axle aperture 33, one sees that movement of the foot pedals forward and backward rotates connecting member 29 about axle 31. A potentiometer 30 registers rotation of the rotatable connecting member 29. The potentiometer 30 is connected to the rotatable connecting member 29 via potentiometer arm 49 and pin 45. Pin 45 extends below the rotatable connecting member 29 and into a slot 47 of potentiometer arm 49.

When the foot pedals 14, 15 are slid forward and backward and the rotatable connecting member 29 rotates about its axle 31, the pin 45 follows an arcuate path about the axle 31. This pin 45 slides within slot 47 to move the potentiometer arm 49. The potentiometer 30 thus generates an electrical signal (a resistance) that corresponds to the rotational position of the rotatable connecting member 29.

The biasing means for the connecting member 29 comprises arcuate slots 32 and 34, pins 35 and 36, springs 39 and 40, stopping tabs 38 and 37, spring interface assemblies 41, and spring connectors 43. The pins 35 and 36 fit into corresponding arcuate slots 32 and 34 of the connecting member 29. Two spring interface assemblies 41 connect pins 35 and 36 to corresponding springs 39 and 40. Each of the springs 39 and 40 is stretched and connected to a corresponding spring connector 43.

Figure 3:
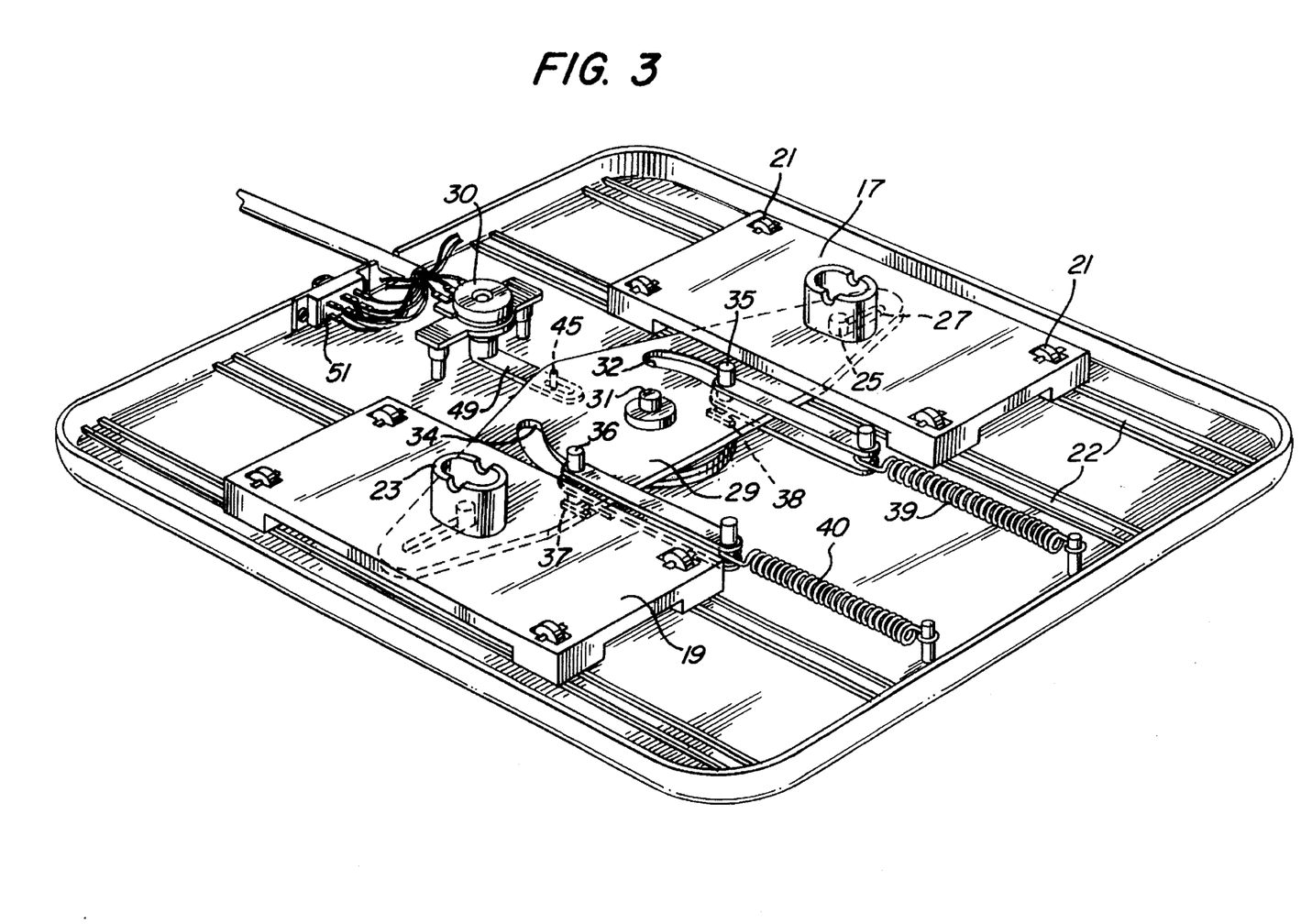
FIG. 3 is a perspective view of the inside structure of the foot pedal assembly in an inactive position, according to the presently preferred embodiment.

An inactive position of the biasing means of the presently preferred embodiment is shown in FIG. 3. The pins 35 and 36 abut against the stopping tabs 38 and 37, respectively, and, accordingly, these pins 35 and 36 do not exert torque on the rotatable connecting member 29. That is, most of the pull from the springs 39 and 40 is absorbed by the two stopping tabs 38 and 37 in this inactive position. The foot pedals 14, 15 assume this position when neither forward nor backward force is applied thereto. The pulling force applied by the springs 39 and 40 is absorbed by the stopping tabs 38 and 37, and torque is not applied to the rotatable connecting member 29.

In this inactive position, each of the lower pins 25 of the foot pedal supports 19, 17 is positioned in an inner part of each corresponding slot 27 on the connecting member 29. The potentiometer arm 49 points directly at the axle 31 in this position.

Figure 4:
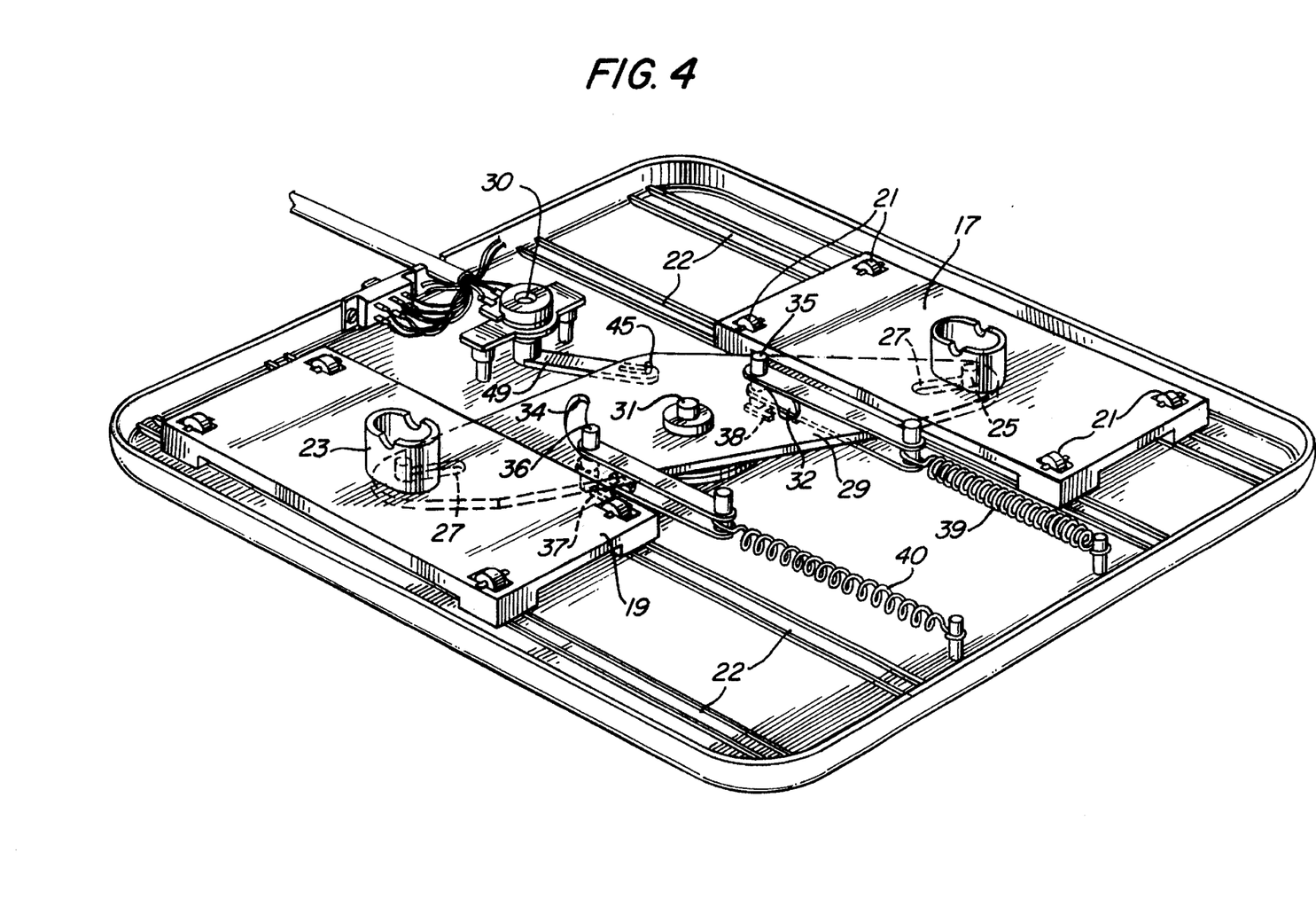
FIG. 4 is a perspective view of the inside structure of the foot pedal assembly in an active position, according to the presently preferred embodiment.

Turning now to FIG. 4, the biasing means of the presently preferred embodiment is shown in an active position. In this exemplary position, the left foot pedal 15 (FIG. 2) is slid forward and the right foot pedal 14 (FIG. 2) is slid backward. Since the pin 35 near the right foot pedal abuts against the corresponding stopping tab 38, the pin 35 does not contact the backward portion of the arcuate slot 32. Therefore, torque is not applied to the rotatable connecting member 29 by spring 39.

Generally, any movement of either of the two foot pedals 14 or 15 in a backward direction maintains the position of the corresponding pin 35 or 36 against the corresponding stopping tab 38 or 37. As the right foot pedal 14 is slid backward, the pin 35 is held by stopping tab 38 as connecting member 29 rotates, through the distance of arcuate slot 37.

Looking at pin 36 near the left foot pedal 15 (FIG. 2), the full tension of the spring 40 is applied to the connecting member 29 through pin 36 at the bottom end of arcuate slot 34. Pin 36, near the left foot pedal, is moved away from its corresponding stopping tab 37 by the bottom end of arcuate slot 34. Pin 36 remains at the bottom of arcuate slot 34 as long as the connecting member 29 is being rotated in this manner.

Generally, forward movement of either of the foot pedals 14 or 15 causes the corresponding pin 35 or 36 to abut against the bottom portion of the corresponding arcuate slot 32 or 34 to thereby apply force to the connecting member 29. Application of this force to the connecting member 29 generally continues until the connecting member 29 is allowed to move back into the inactive position. In other words, the biasing means of the presently preferred embodiment applies force to a foot pedal in a forward position until that foot pedal is brought back to its inactive position. Without the stopping tabs 37 and 38, the realistic feel in pulling back only on the forward foot pedal could not be achieved.

The active position shown in FIG. 4 positions each of the lower pins 25 attached to the foot pedal supports 17, 19 to the outer ends of the slots 27. Additionally, the potentiometer arm 49 is rotated to reflect the rotation of the connecting member 29. The potentiometer 30 reads the movement of the potentiometer arm 49 and changes its variable potential accordingly.

Figures 5, 6:
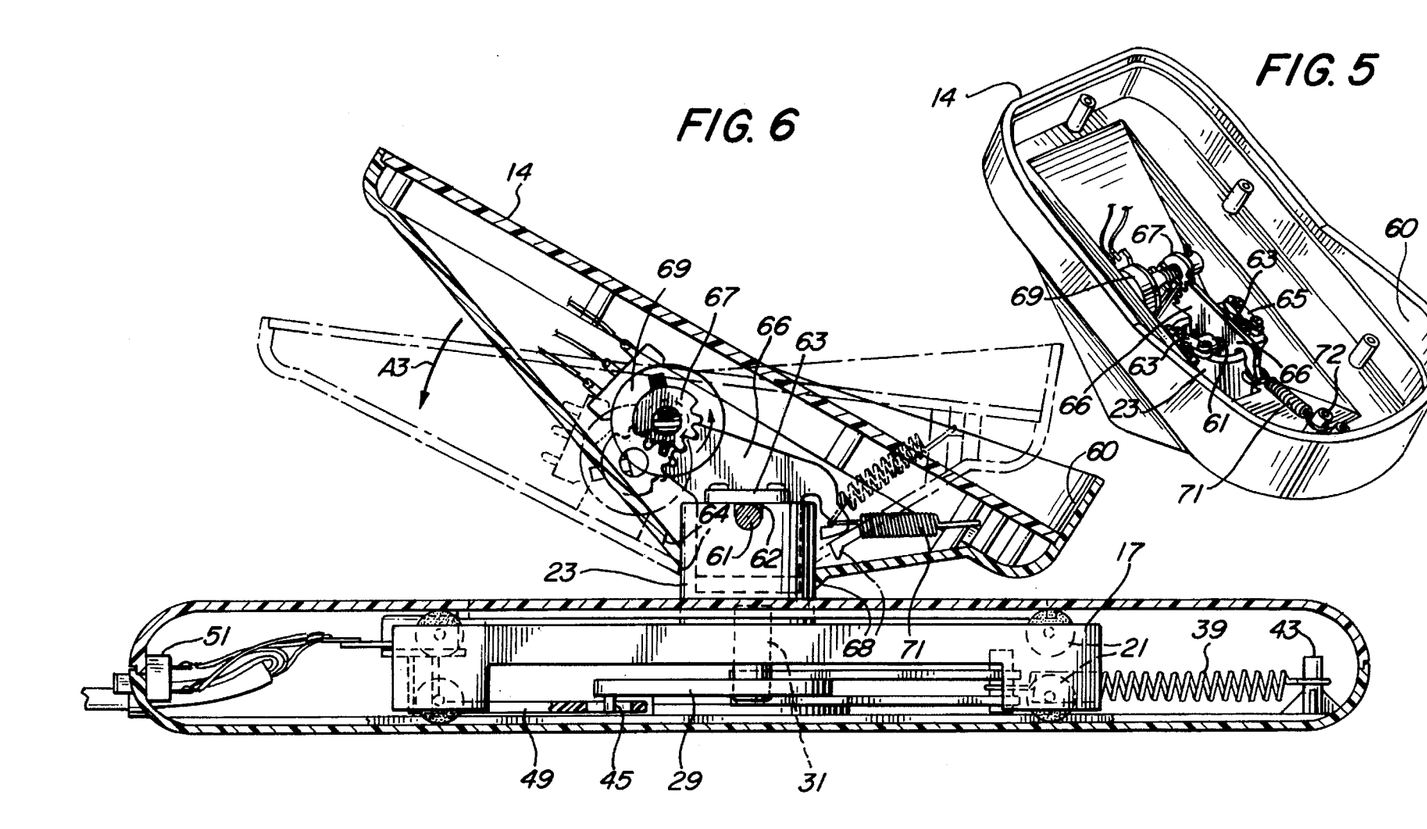
FIG. 5 is a perspective view of the internal structure of one of the foot pedals of the presently preferred embodiment.
FIG. 6 is a cross-sectional view of the foot pedal assembly of the presently preferred embodiment.

The interior of the right foot pedal 14 is shown in FIG. 5. The protrusion 23 of the foot pedal support 17 (FIG. 4) extends into this interior. An axle pin 61 fits into a gap 62 in this protrusion 23. Inner pin retainers 63 are secured onto the protrusion 23 to retain the pin 61 thereon. Outer pin retainers 65 are secured to portions of the foot pedal 14 to thereby firmly and pivotally hold the foot pedal 14 about the pin 61.

The foot pedal 14 comprises a heel rest 60, which comfortably supports a user's foot on the foot pedal 14, especially in the inactive position.

Prior art devices do not incorporate any type of heel rest. Nor do prior art devices use a foot pedal that pivots about a pin located between the middle and rear of the foot pedal. The location of the pin 61 close to the heel rest 60 provides a comfortable and effective pivoting configuration.

A fixed member 66 has a spring 71 attached thereto. The spring 71 is secured between the fixed member 66 and a spring connector 72. The pin 61 runs through the fixed member 66. Since the fixed member 66 fits snugly into the protrusion 23, this fixed member 66 does not move when the foot pedal 14 is pivoted. The spring connector 72 is secured to a portion of the foot pedal 14.

The foot pedal 14 is biased in an inactive position by the spring 71. A rotating gear 67 is connected to a potentiometer 69, which generates an electric signal reflecting rotary movement of the foot pedal 14. The rotating gear 67 moves along the teeth of the fixed member 66 when the foot pedal 14 is pivoted about the pin 61.

FIG. 6 shows a cross-section of the foot pedal assembly of the presently preferred embodiment. The foot pedal 14 is shown in an inactive position, where the foot pedal 14 is normally held by the spring 71. When the foot pedal 14 is depressed, as shown by the phantom lines, the toe portion of the foot pedal 14 moves in a downward direction shown by the arrow A3, and the spring 71 is stretched. In the inactive position, the rotating gear 67 interfaces with upper teeth of the fixed member 66. As the foot pedal 14 is depressed, the rotating gear 67 rotates in a counterclockwise direction and moves downward along the teeth of the fixed member 66. Thus, as the rotating gear 67 rotates, the potentiometer 69 is able to generate an electrical signal indicative of the rotatable position of the foot pedal 14.

A front stop 64 prevents the foot pedal 14 from pivoting in the direction of arrow A3 past a first predetermined position when a user presses on the foot pedal 14, and a rear stop 68 prevents the spring 71 from pivoting the foot pedal 14 in the opposite direction past a second predetermined position.

Figure 7:
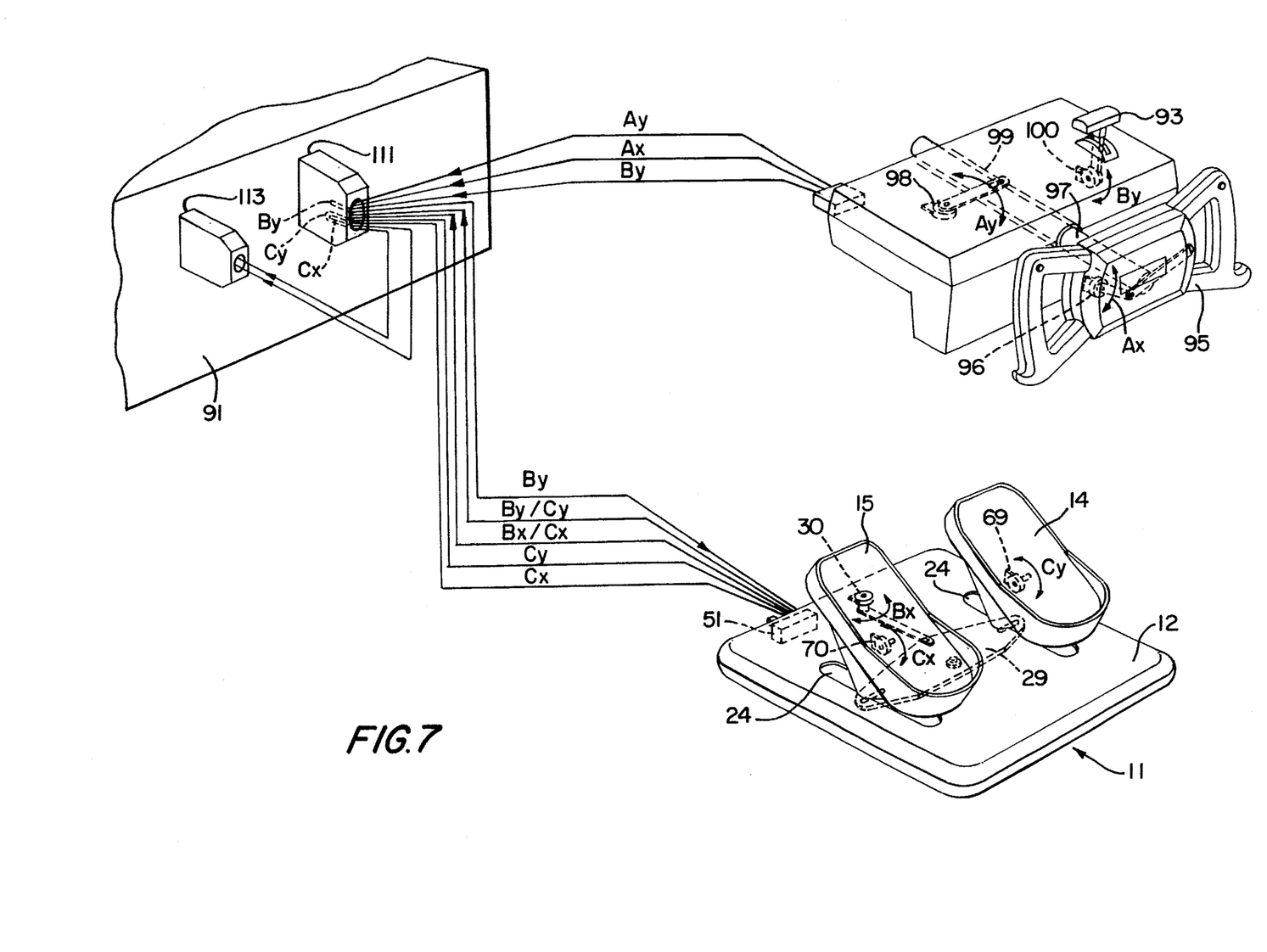
FIG. 7 is a schematic diagram showing generation and routing of signals used with the presently preferred embodiment.

Turning to FIG. 7, the foot pedal assembly 11 of the presently preferred embodiment generates three inputs for use by a gaming device. Specifically, the two foot pedal potentiometers 69 and 70 and the rudder potentiometer 30 generate the three inputs. Other inputs, however, are used by the gaming device.

As shown in FIG. 7, a steering wheel 95 can be rotated to activate a potentiometer 96 and to thereby generate an input $A_x$. The steering wheel 95 is connected to a shaft 97, which fits into an accommodating member 99. The movement of the shaft 97 within the accommodating member 99 activates a potentiometer 98 to thereby generate another input $A_y$. The position of a throttle lever 93 activates a potentiometer 100 to thereby generate a third additional input $B_y$.

The three inputs generated by the foot pedal assembly 11 of the presently preferred embodiment are also shown in FIG. 7. A first input $C_y$ is generated by potentiometer 69 from the pivoting of the right foot pedal 14. A second input $C_x$ is generated by potentiometer 70 from the pivoting of the left foot pedal 15. The third input $B_x$ is generated by potentiometer 30 from the forward and backward movement of the right foot pedal 14 and the left foot pedal 15.

The $A_x$ left/right steering signal and the $A_y$ in/out steering signal are input directly into the main game port 111 of a gaming device 91. The $B_x$ rudder signal and the $B_y$ throttle signal, and the $C_x$ left pedal signal and the $C_y$ right pedal signal are alternatively input into gaming device 91 in groups of two, depending on whether the flying mode or the driving mode is selected, respectively.

The gaming device 91 may comprise, for example, a personal computer with a standard game card (not shown) having the one main game port 111. The single game port 111 allows for a Joystick A input and a Joystick B input. Each joystick input allows for two input signals. Thus, the Joystick A input comprises the $A_x$ left/right steering signal and the $A_y$ in/out steering signal, and the Joystick B input comprises the $B_x$ rudder signal and the $B_y$ throttle signal (or the $C_x$ left pedal signal and the $C_y$ right pedal signal in the driving mode).

A game card having an additional game port 113 can be used in the presently preferred embodiment to provide an effective Joystick C input, which feeds the $C_x$ and $C_y$ toe brake inputs for use in the flying mode directly into the gaming device 91. In an alternative embodiment, only the main game port 111 is used, and the toe brake function is not available in the flying mode.

In the flying mode of the presently preferred embodiment, the $A_y$ in/out steering signal and the $A_x$ left/right steering signal are both used by the gaming device 91. Additionally, both the $B_y$ throttle signal and the $B_x$ rudder signal are input and used by the gaming device 91, as well as the $C_y$ right foot pedal signal and the $C_x$ left foot pedal signal.

In the driving mode, only the $A_x$ left/right steering signal, the $C_y$ right foot pedal signal, and the $C_x$ left foot pedal signal are used by the gaming device 91. The foot pedal assembly of the present invention thus inputs either of two signals on each line of the Joystick B input. One line of the Joystick B input is shown with "$B_y/C_y$" thereon, and the other line of the Joystick B input is shown with "$B_x/C_x$" thereon. The $B_y$ and $B_x$ on the left sides of the "/" characters are placed on the Joystick B lines in the flying mode, and the $C_y$ and $C_x$ on the right side of the "/" characters are placed on the Joystick B lines in the driving mode.

In the presently preferred embodiment, the Joystick A input, the Joystick B input, and the Joystick C input are all combined to form a combination of inputs for a single user. Although game ports of the prior art generally have inputs for only two joysticks (the Joystick A input and the Joystick B input), a game card used with the presently preferred embodiment accommodates the two additional channels of input (the Joystick C input). As discussed above, these two additional channels can thereby be used in the flight mode for the left and right toe brake inputs, or may not be used with simple gaming devices not having the additional game port 113.

Figure 8:
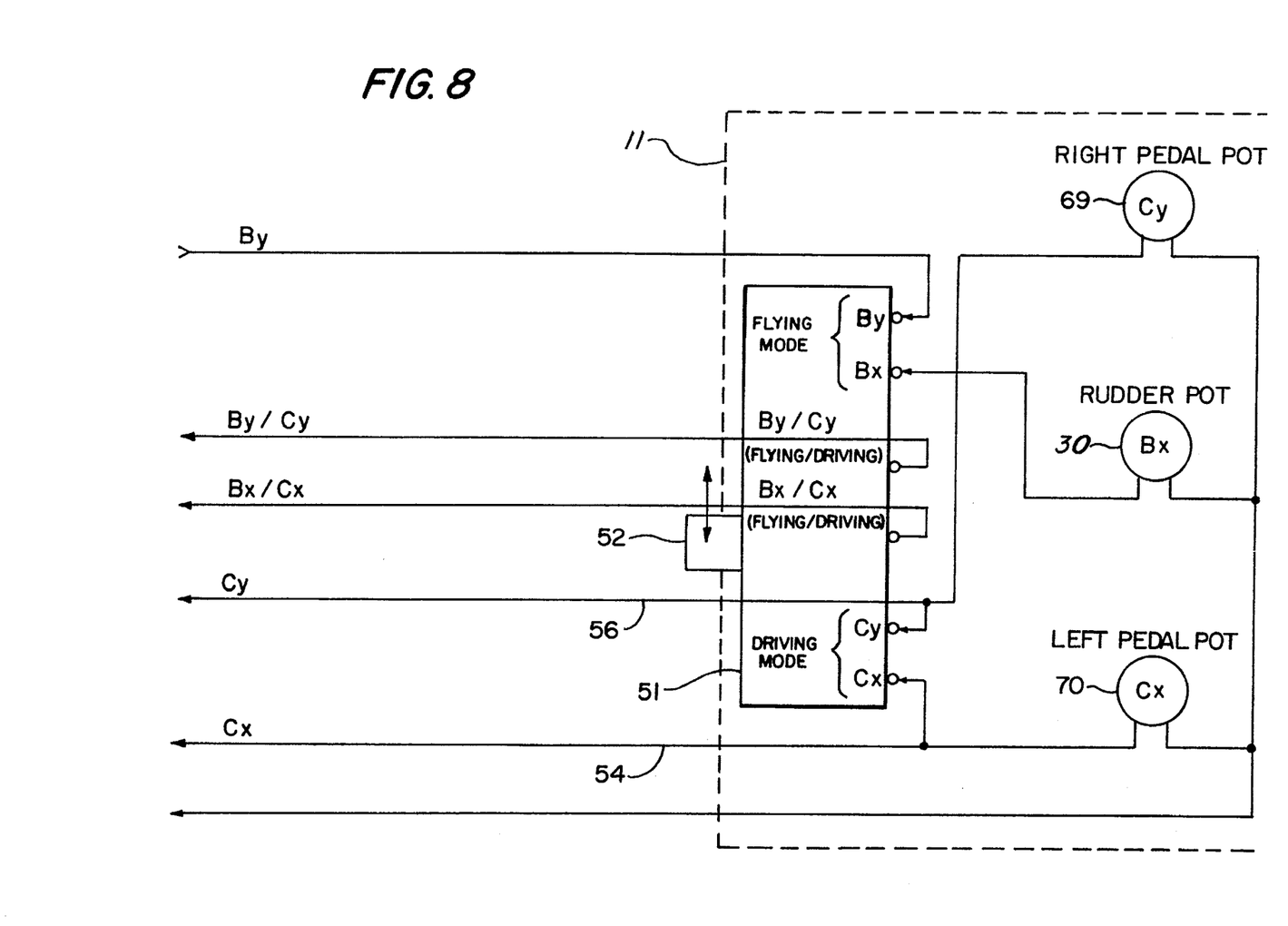
FIG. 8 is a schematic diagram showing routing of signals from the three potentiometers in the foot pedal assembly in the flying mode or when the driving mode is selected.

FIG. 8 shows the mode switch 51 within the foot pedal assembly 11 of the presently preferred embodiment. A knob 52 can be gripped by a user and moved between two positions to select between a flying mode and a driving mode. The mode switch 51 in the preferred embodiment comprises a double-pole/single-throw switch. As shown in FIG. 8, the $B_y$ throttle input is fed from the throttle lever 93 outside the foot pedal assembly 11 to the mode switch 51 of the presently preferred embodiment. The $B_x$ rudder input is fed from the rudder potentiometer 30 to the mode switch 30. These two inputs, $B_y$ and $B_x$, are used in the flying mode.

Two other inputs, $C_y$ and $C_x$, are used for the same two inputs in the driving mode. The mode switch 51 switches between these two pairs of inputs depending on the mode, selected by knob 52. The $C_y$ right foot pedal input and the $C_x$ left foot pedal input are switched by the mode switch 51, and are also fed to the joystick C input via lines 54 and 56. The mode switch 51 thus outputs $B_y$ and $B_x$ in the flying mode, and outputs $C_y$ and $C_x$ in the driving mode. These switched outputs are indicated by the "$B_y/C_y$" and the "$B_x/C_x$" characters shown in the figure.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A foot operated signal producing device comprising:

(a) a left foot pedal;

(b) left support means for supporting the left foot pedal, the left support being slidable forward and backward;

(c) a right foot pedal;

(d) right support means for supporting the right foot pedal, the right support means being slidable forward and backward;

(e) means for interconnecting the two support means, the interconnecting means being rotatable clockwise and counterclockwise about an axis intermediate the left and right support means by torque applied against the foot pedals;

(f) signal means, operably coupled to the interconnecting means, for generating a signal corresponding to a rotated position of the interconnecting means; and (g) spring means for applying opposing torque to the interconnecting means whenever the interconnecting means is rotated in either direction from a predetermined rest position.

2. The device according to claim 1 wherein the spring means comprises:
   (a) two opposing arcuate slots defined by the interconnecting means on opposite sides of the axis;
   (b) two pin means for engaging respective arcuate slots; and
   (c) two springs, one operatively attached to each of the pin means, for urging them in a predetermined direction.

3. The device according to claim 1 further comprising means for relieving the interconnecting means of all torque from the spring means whenever the interconnecting means is in the rest position.

4. The device according to claim 2 further comprising stop means for stopping movement of each pin means in its arcuate slot whenever movement of said each pin means would not bias the interconnecting means to the rest position.

5. The device according to claim 1, wherein the signal means comprises a potentiometer having a wiper arm operatively coupled to the interconnecting means.

6. The device according to claim 1 wherein each of the support means comprises means for pivotally coupling to a respective end of the interconnecting means, the pivotal coupling allowing forward and backward movement of said each support means over a range.

7. The device according to claim 6 wherein the means for pivotally coupling each support means to a respective end of the interconnecting means comprises:
   (a) a slot defined by the interconnecting means at said respective end; and
   (b) pin means, extending below each support means, for rotatably and slidably engaging the slot.

8. The device according to claim 5 wherein the operative coupling of the wiper arm of the signal means potentiometer to the interconnecting means comprises:
   (a) a slot defined near a free end of the wiper arm of the potentiometer; and
   (b) pin means, extending from the interconnecting means, for rotatably and slidably engaging the wiper arm slot, the pin means of the interconnecting means being moved about an arcuate path relative to the axis whenever the interconnecting means is rotated.

9. A foot operated signal producing device comprising:
   (a) a left pivotable foot pedal;
   (b) signal means for generating a first signal which at any given time corresponds to the pivoted position of the left foot pedal at the time;
   (c) left support means for supporting the left foot pedal, the left support being slidable forward and backward;
   (d) a right foot pedal;
   (e) signal means for generating a second signal which at any given time corresponds to the pivoted position of the right foot pedal at the time;
   (f) right support means for supporting the right foot pedal, the right support means being slidable forward and backward;
   (e) means for interconnecting the two support means, the interconnecting means being rotatable clockwise and counterclockwise about an axis intermediate the left and right support means by torque applied against the foot pedals;
   (f) signal means for generating a third signal which at any given time corresponds to the rotated position of the interconnecting means at the time.

10. The device according to claim 9 further comprising spring means for applying opposing torque to the interconnecting means whenever the interconnecting means is rotated in either direction from a predetermined rest position.

11. The device according to claim 10 wherein the spring means comprises:
    (a) two opposite arcuate slots defined by the interconnecting means on opposite sides of the axis;
    (b) two pin means for engaging respective arcuate slots; and
    (c) two springs, one operatively attached to each of the pin means, for urging them in a predetermined direction.

12. The device according to claim 10 further comprising means for relieving the interconnecting means of all torque from the spring means whenever the interconnecting means is in the rest position.

13. The device according to claim 11 further comprising stop means for stopping movement of each pin means in its arcuate slot whenever movement of said each pin means would not bias the interconnecting means to the rest position.

14. The device according to claim 9 wherein the first, second and third signal generating means comprise each a potentiometer having a wiper arm, the wiper arms of the potentiometers being operatively coupled to the left foot pedal, the right foot pedal, and the interconnecting means, respectively.

15. The device according to claim 9 wherein each of the support means comprises:
    (a) protrusion means, extending above and carried by said each support means, for pivotally supporting its respective foot pedal; and
    (b) means for pivotally coupling to a respective end of the interconnecting means, the pivotal coupling allowing forward and backward movement of said each support means over a range.

16. The device according to claim 15 wherein the means for pivotally coupling each support means to a respective end of the interconnecting means comprises:
    (a) a slot defined by the interconnecting means at said respective end; and
    (b) pin means, extending below each support means, for rotatably and slidably engaging the slot.

17. The device according to claim 14 wherein the operative coupling of the third signal means potentiometer to the interconnecting means comprises:
    (a) a slot defined near a free end of the wiper arm of the potentiometer; and
    (b) pin means, extending from the interconnecting means, for rotatably and slidably engaging the wiper arm slot, the pin means of the interconnecting means being moved about an arcuate path relative to the axis whenever the interconnecting means is rotated.

18. The device according to claim 9 further comprising:
    (a) means for receiving a fourth signal;
    (c) two signal outputs; and
    (b) means for selectively coupling the signals, two at a time, to the signal outputs.

19. The device according to claim 18 further comprising manually operated switching means for selectively coupling the signals to the signal outputs.

20. The device according to claim 18 wherein the means for selectively coupling selects between the third and fourth signals, and the first and second signals.

21. The device according to claim 19 wherein the switching means can be switched between the third and fourth signals, and the first and second signals.

22. A computer input device comprising:
(a) a left pivotable foot pedal;
(b) means for generating a first signal which at any given time corresponds to the pivoted position of the left foot pedal at the time;
(c) a right foot pedal;
(d) means for generating a second signal which at any given time corresponds to the pivoted position of the right foot pedal at the time;
(e) means for moving the foot pedals oppositely back and forth to simulate an airplane's rudder control mechanism;
(f) means for generating a third signal indicative of a relative position between the left and right foot pedals;
(g) a hand-operated lever;
(h) means for generating a fourth signal which at any given time corresponds to the position of the lever at the time;
(i) means for selecting the four signals two at a time; and
(j) means for coupling the selected signals to the computer.

23. The computer input device according to claim 22 further comprising means for directly communicating at least one of the four signals to the computer.

24. The computer input device according to claim 22 further comprising means for directly communicating the first and second signals to the computer.

25. The computer input device according to claim 22 wherein the computer includes a game port having at least two joystick inputs, and wherein the device further comprises:
(a) a steering wheel rotatable about an axis;
(b) means for generating a fifth signal which at any given time corresponds to the rotational position of the steering wheel at the time;
(c) means for axially varying, in and out, the position of the steering wheel;
(d) means for generating a sixth signal which at any given time corresponds to the axial position of the steering wheel at the time; and
(e) means for coupling the selected signals to one of the joystick inputs and the fifth and sixth signals to the other joystick input.

26. The computer input device according to claim 25 wherein the means for coupling the signals to the joystick inputs comprises:
(a) a connector for mating with the game port;
(b) a first cable including wire means for communicating the selected signals to a portion of the connector coupled to said one of the joystick inputs;
(c) a second cable including wire means for communicating the fifth and sixth signals to a portion of the connector coupled to said other joystick input; and
(d) wire means, traversing both cables and the connector, for communicating the fourth signal from the means for generating same to the means for selecting.

27. The computer input device according to claim 25 further comprising means for directly coupling the first and second signals to a third joystick input of the computer.

28. The computer input device according to claim 27 wherein the means for directly coupling the first and second signals to a third joystick input comprises wire means, traversing the first cable and the connector, for coupling said signals to the third joystick input.

29. A foot pedal assembly, comprising:
(a) a lower housing having a plurality of lower roller channels on an inner surface of the lower housing, the lower roller channels being parallel to each other and extending from a forward portion of the lower housing to a rear portion of the lower housing;
(b) an upper housing fitting above the lower housing, comprising:
(1) a left slot extending from a forward portion of the upper housing to a rear portion of the upper housing; and
(2) a right slot parallel to the left slot;
(c) a left foot pedal above the left slot of the upper housing;
(d) a left slidable foot pedal support below the upper housing, connected to the left foot pedal through the left slot, the left foot pedal support having a plurality of rollers that roll along the lower roller channels;
(e) a right foot pedal above the right slot of the upper housing; and
(f) a right slidable foot pedal support below the upper housing, connected to the right foot pedal through the right slot, the right slidable foot pedal support having a plurality of rollers that roll along the lower roller channels.

30. A pivotable foot pedal assembly, comprising:
(a) a pin;
(b) a protrusion having an upper portion for accommodating the pin;
(c) a foot pedal comprising:
(1) an aperture in a lower portion of the foot pedal for receiving the protrusion; and
(2) two opposing inner walls, each of the inner walls having a gap formed therein for accommodating end portions of the pin, wherein the foot pedal pivots about the pin secured to both the foot pedal inner walls and the protrusion; and
(d) a spring connected between the protrusion and the foot pedal to bias the foot pedal to an inactive position.

31. The pivotable foot pedal of claim 30, further comprising:
a potentiometer secured to the foot pedal;
a gear attached to the potentiometer;
a fixed member secured to the protrusion and connecting the spring to the protrusion, the fixed member having a plurality of teeth for accommodating the gear of the potentiometer, wherein pivoting of the foot pedal about the pin causes the gear of the potentiometer to move about the teeth of the fixed member to thereby generate a signal indicative of the pivotal position of the foot pedal.

32. The pivotable foot pedal of claim 30, further comprising:
a first stopping portion formed at a forward end of the aperture for contacting the protrusion when the foot pedal is pivoted against tension of the spring to a first predetermined position, the contacting preventing further pivotal movement of the foot pedal against tension of the spring; and
a second stopping portion formed at a rear end of the aperture for contacting the protrusion when the foot pedal is pivoted under tension of the spring to a second predetermined position, the contacting of the second stopping portion with the protrusion preventing further pivotal movement of the foot pedal in the direction of the tension applied by the spring.

33. A foot pedal assembly, comprising:

(a) a lower housing having four lower roller channels on an inner surface of the lower housing, the four lower roller channels being parallel to each other and extending from a forward portion of the lower housing to a rear portion of the lower housing;

(b) an upper housing providing four upper roller channels which are opposite to and parallel to the four lower roller channels;

(c) a left foot pedal;

(d) a left foot pedal support below the upper housing, connected to the left foot pedal and comprising:
  (1) an upper set of four rollers fitting into a first two of the four upper roller channels; and
  (2) a lower set of four rollers fitting into a first two of the four lower roller channels;

(e) a right foot pedal; and (f) a right foot pedal support below the upper housing, connected to the right foot pedal and comprising:
  (1) an upper set of four rollers fitting into a second two of the four upper roller channels; and
  (2) a lower set of four rollers fitting into a second two of the four lower roller channels.

* * * * *